United States Patent [19]

Hedeen

[11] Patent Number: 5,558,261

[45] Date of Patent: Sep. 24, 1996

[54] BICYCLE CARRIER

[76] Inventor: Nils E. Hedeen, 2741 N. Campbell Ave., Chicago, Ill. 60647-1922

[21] Appl. No.: 353,093

[22] Filed: Dec. 9, 1994

[51] Int. Cl.$^6$ ..................................................... B60R 9/10
[52] U.S. Cl. ...................... 224/511; 70/259; 248/229.12; 248/231.41; 224/500; 224/535; 224/536; 224/537; 224/42.13; 224/924
[58] Field of Search .................... 224/42.13, 924, 224/511, 500, 537, 536, 494, 495; 248/316.4, 316.6, 229.12, 229.22, 228.3, 231.41; 211/17, 8; 70/259, 260, 226; 24/524; 269/228

[56] References Cited

U.S. PATENT DOCUMENTS

| 140,136 | 6/1873 | Holt et al. ............................... 269/228 |
| 1,798,239 | 3/1931 | Welker et al. ........................... 224/511 |
| 2,379,107 | 6/1945 | Scheck .................................... 269/228 |
| 2,432,249 | 12/1947 | Pearson .................................... 224/515 |
| 3,972,457 | 8/1976 | Kesler ..................................... 224/42.13 |
| 5,067,641 | 11/1991 | Johnson et al. .......................... 224/536 |
| 5,085,360 | 2/1992 | Fortune et al. ......................... 224/42.13 |
| 5,092,426 | 3/1992 | Rhodes ..................................... 269/228 |

FOREIGN PATENT DOCUMENTS 506002  8/1930  Germany ............................... 224/924

*Primary Examiner*—Linda J. Sholl
*Attorney, Agent, or Firm*—Douglas B. White

[57] ABSTRACT

The carrier described herein employs opposing hook members projecting from a base to clamp the spare tire (mounted on the rear of a vehicle) therebetween. The extension of one of these hooks is adjustable, to accommodate different sized tires, and a locking mechanism is employed to facilitate secure attachment. Apparatus for supporting and stabilizing the bicycle protrudes rearwardly from the hook and base members.

14 Claims, 5 Drawing Sheets

FIG. 6a
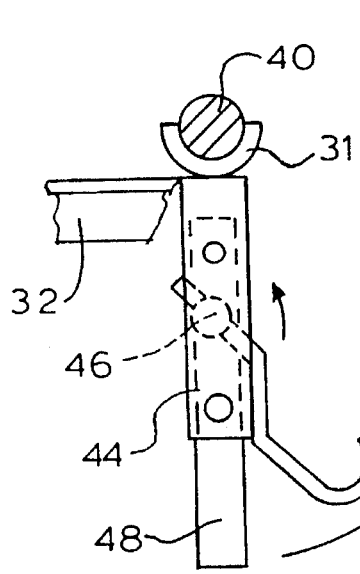
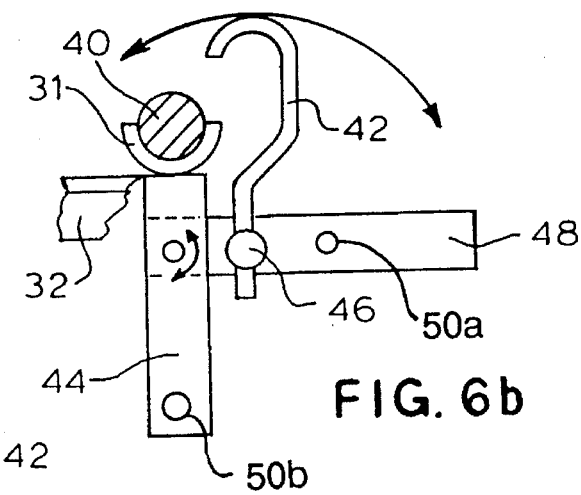
FIG. 6b
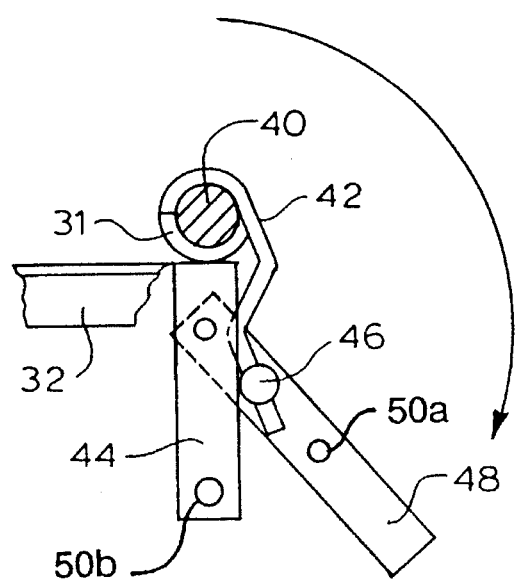
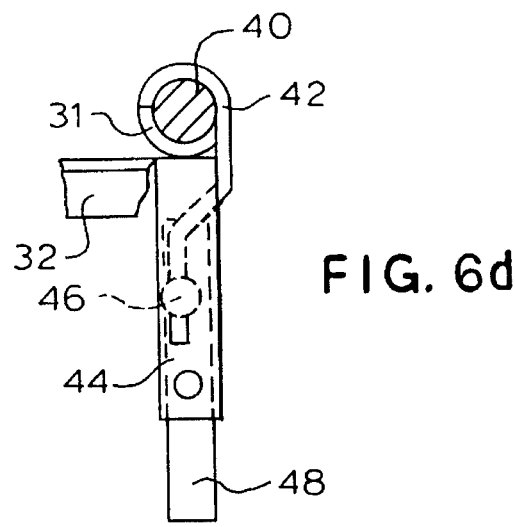
FIG. 6d
FIG. 6c 5,558,261

BICYCLE CARRIER

BACKGROUND OF THE INVENTION

1. Field of the Invention

This invention relates generally to apparatus which attaches to automobiles for carrying bicycles, and more specifically to a novel carrier for attachment to a spare tire mounted on the rear of an automobile.

2. Description of the Prior Art

Prior art bicycle carriers typically attach to a trunk lid or bumper and do not readily accommodate vehicles with rear mounted spare tires. Recently, a carrier has been marketed under the trademark Rhode Gear which attaches to a rear mounted spare tire by use of a bar which encircles the upper part of the spare tire. This prior design, however, fails to attach securely to the spare tire and does not deter theft.

SUMMARY OF THE INVENTION

The present invention not only provides a secure attachment to the spare tire, but it also allows a variety of mounting positions to avoid obstructing the view of the vehicle's taillights by the bicycle.

The carrier described herein employs opposing hook members projecting from a base which act to clamp the spare tire therebetween. The extension of one of these hooks is adjustable to accommodate different sized tires, and a locking mechanism is employed to facilitate secure attachment. Apparatus for supporting and stabilizing the bicycle protrudes rearwardly from the hook members and also employs a locking mechanism to hold the bicycle.

BRIEF DESCRIPTION OF THE DRAWINGS

FIGS. 6a–6d illustrate the locking mechanism for securing the bicycle to the carrier.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
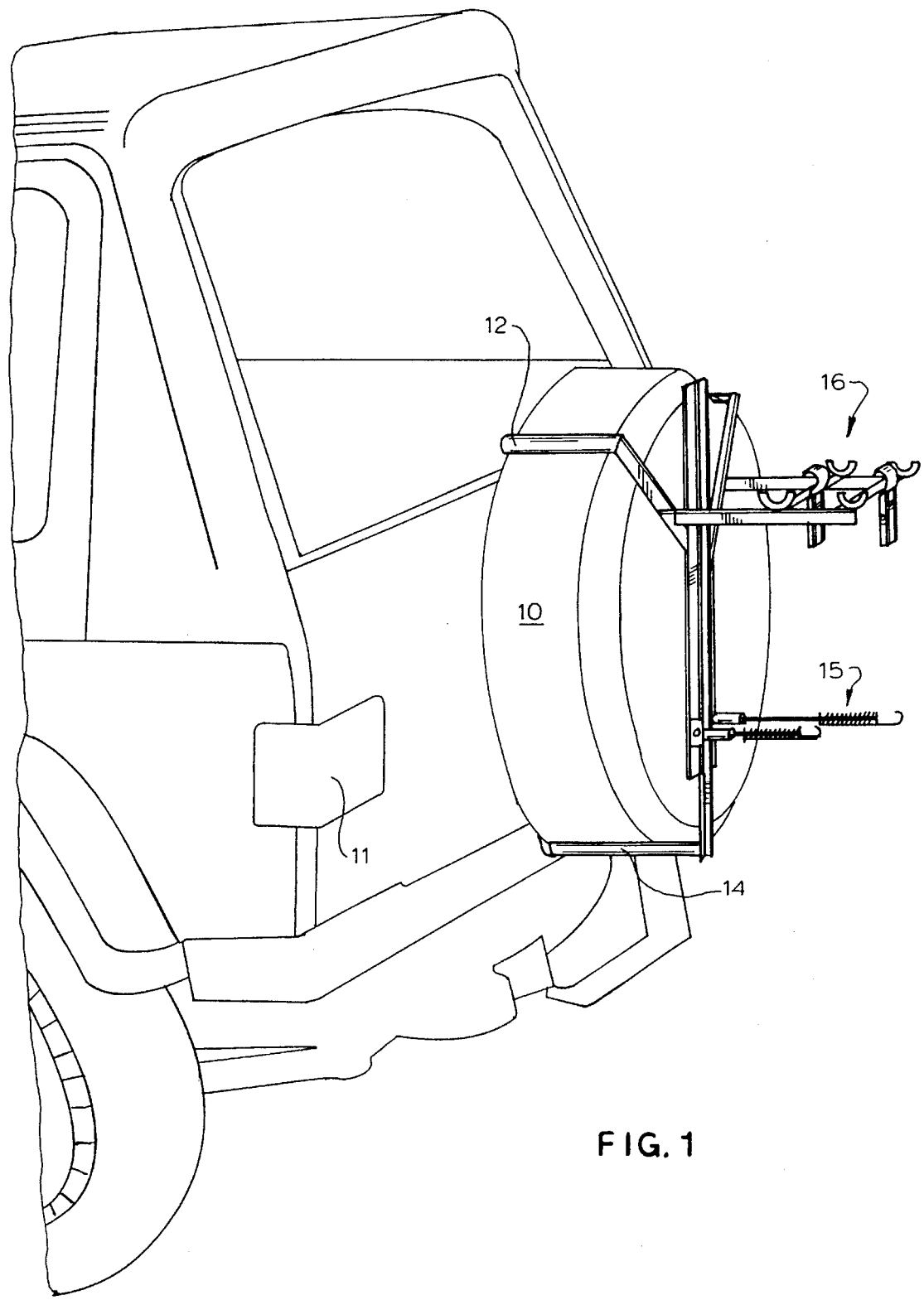
FIG. 1 is a pictorial view of the carrier of the present invention installed on a rear mounted spare tire.

Turning first to FIG. 1 there is shown a bicycle carrier in accordance with the present invention attached to a rear mounted spare tire 10 of an automobile. Dual upper hooks 12 and a lower hook 14 clamp the carrier to the spare tire, and a protruding support 16 and stabilizer 15 function to hold the bicycle to the carrier.

Figure 5A:
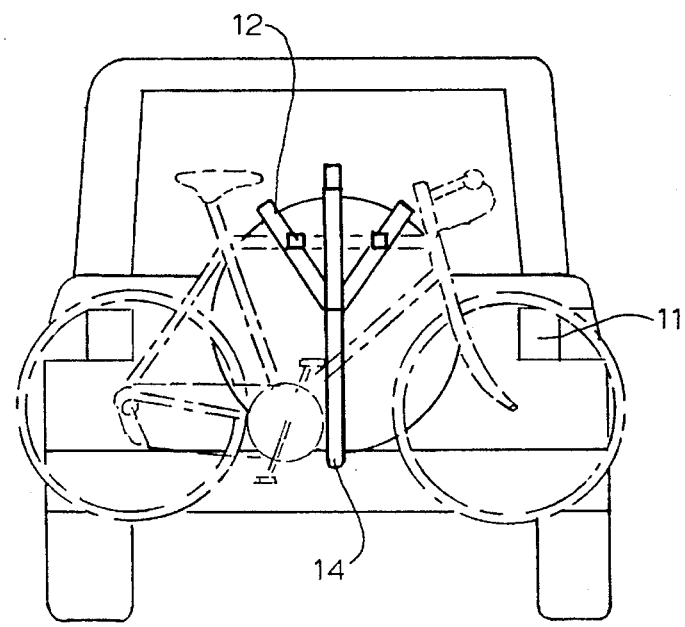
FIG. 5a depicts a typical mounting position for bicycles.
Figure 5B:
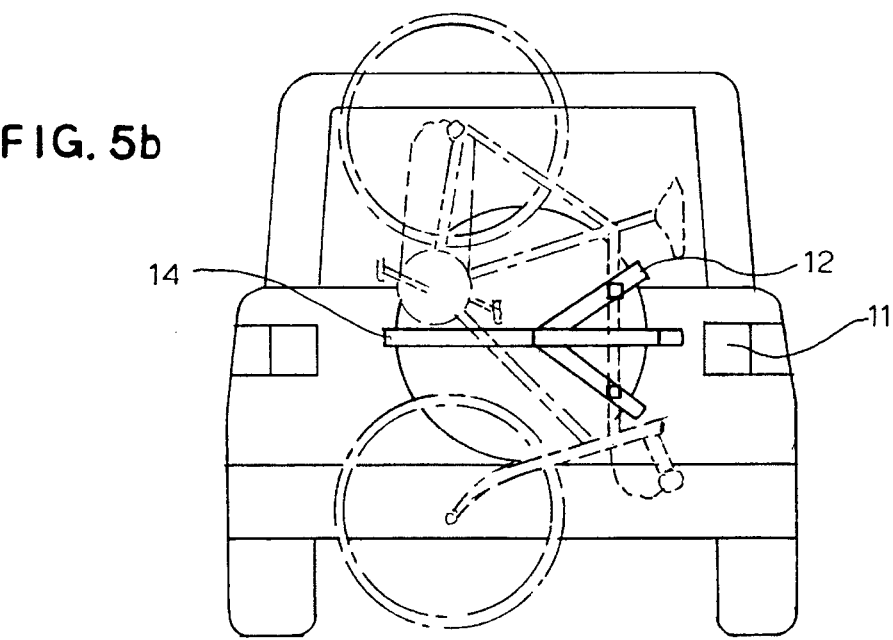
FIG. 5b depicts an alternative mounting position uniquely attainable with the carrier of the present invention.

Since this carrier securely clamps onto the spare tire, it may be positioned at any desired angle on the tire (see FIG. 5a and FIG. 5b) to hold the bicycle in a variety of positions. As depicted in FIG. 5a, when the bicycle is carried in the traditional horizontal position, it often blocks the taillights 11 of a vehicle. Yet this is easily corrected with the carrier of the present invention by means of a rotation of the mounting as shown in FIG. 5b.

Figure 2:
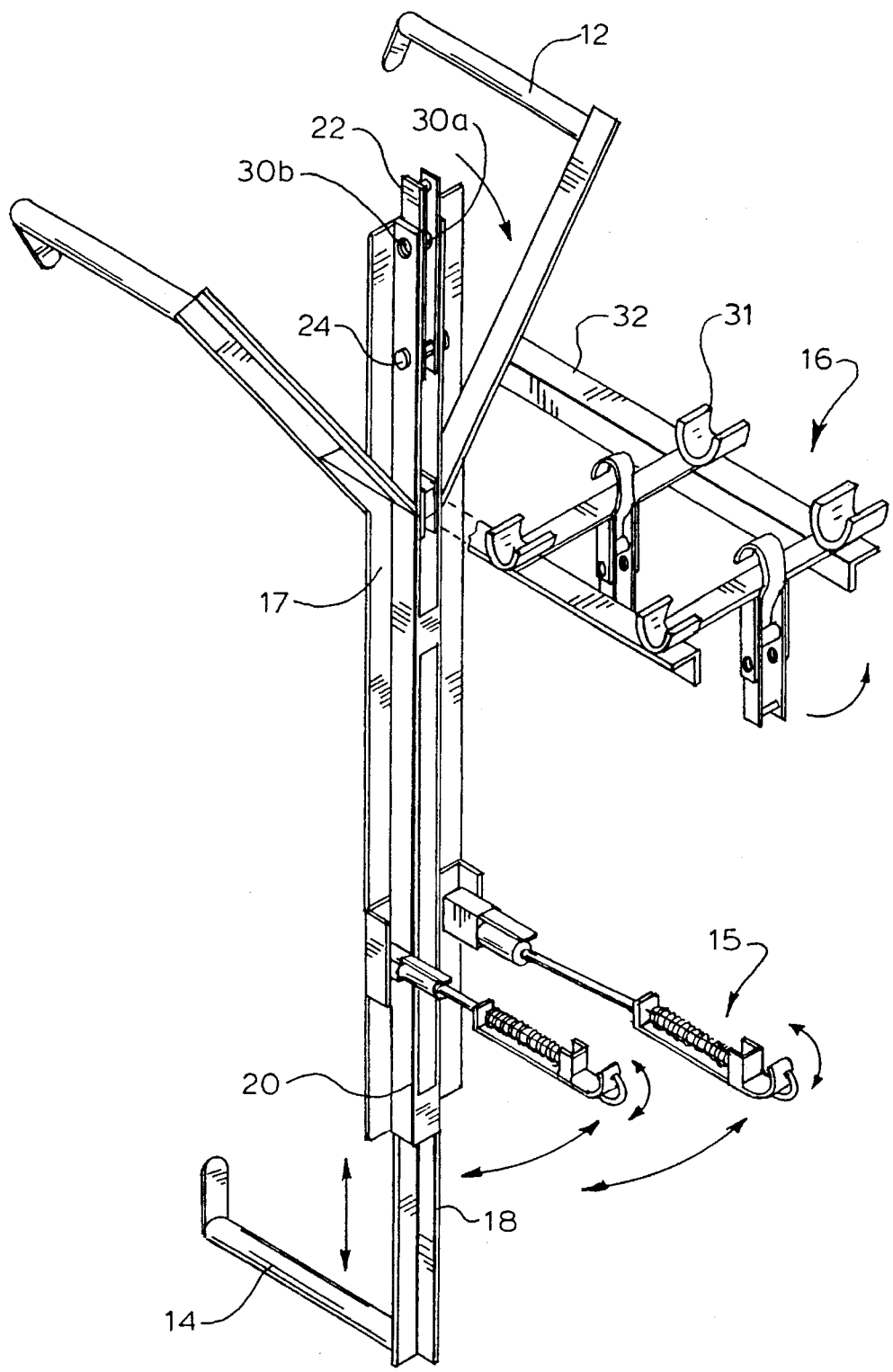
FIG. 2 is a perspective view of the carrier of the present invention.

As shown most clearly in FIG. 2, upper hooks 12 protrude in spaced relation from a defined base section 17. The lower hook 14 (or hooks) protrudes from a slide member 18 constrained to move within a channel 20 defined in the base section. At its upper end this slide member is attached to an adjustable locking lever 22.

Figure 3:
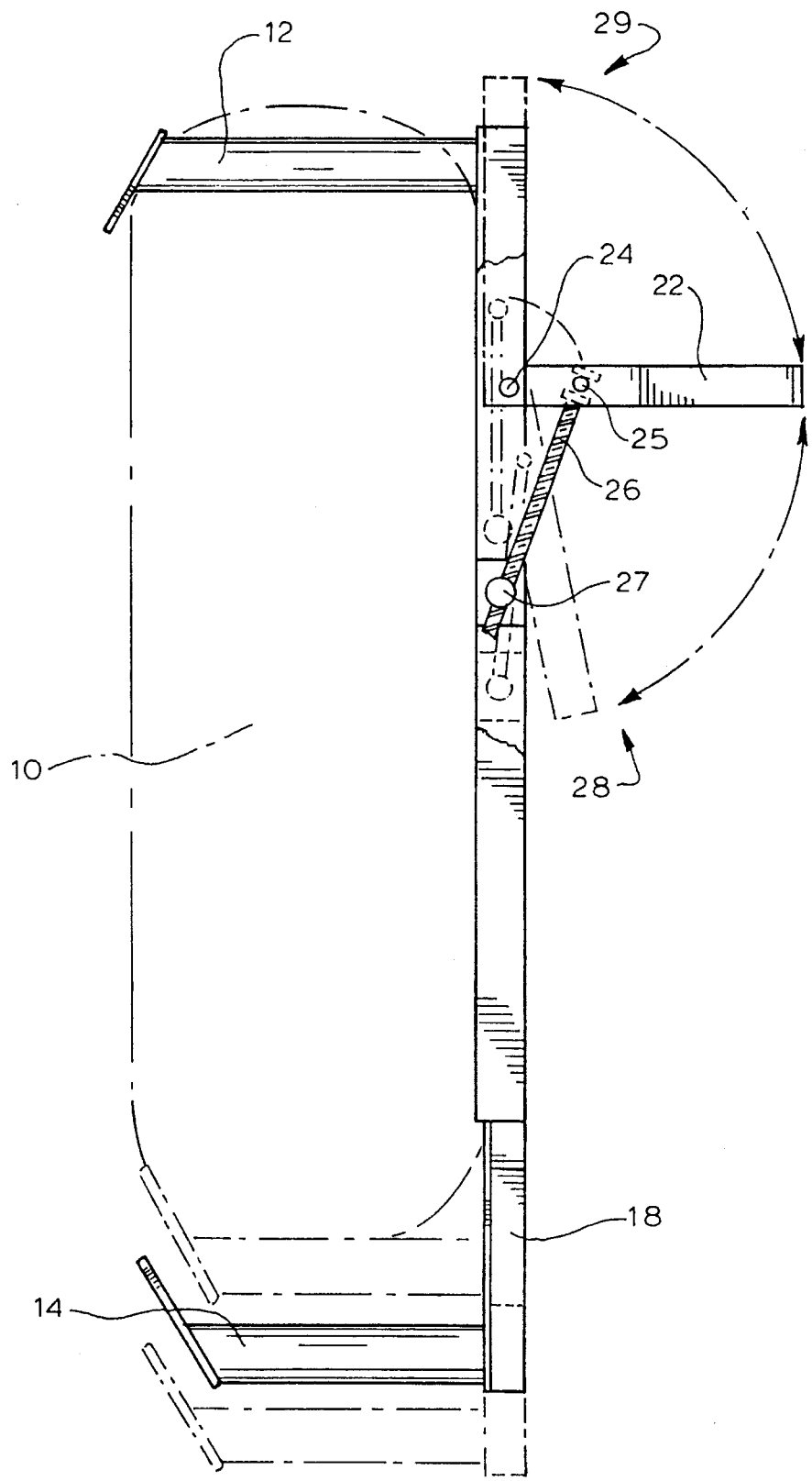
FIG. 3 is a side view, partially cut away, of the carrier of the present invention illustrating the locking mechanism feature.

The adjustable locking mechanism, (depicted in detail in FIG. 3) employs a lever 22 pivotally attached to the base section at pivot 24. A threaded bolt member 26 is pivotally attached to the slide member 18 at one end and attached to the lever 22 at its other end through a pivotally mounted retainer 25 which allows axial rotation. By use of a threaded nut 27 at the connection to the slide, axial rotation of the bolt 26 within the retainer and threaded nut causes it to lengthen/shorten the distance between the locking lever and the slide member. In this manner the distance between the upper and lower hooks is adjustable to adapt to any size tire (or other object) to which the carrier is attached.

Once the distance between the hooks is adjusted, the carrier is clamped to the tire. First, the cam lever is placed in the lower position 28, causing the lower hook extend. Then the cam lever is raised to the upper position 29, retracting the lower hook, to thereby clamp the carrier onto the tire. With the locking lever in this upper position, holes 30a in the lever (FIG. 2) now line up with holes 30b in the base section to allow for the addition of a padlock. As a further anti-theft feature of this carrier, when the cam lever is placed in its upper position, the threaded bolt 26 lies within the narrow channel 20 and is inaccessible.

Turning again to FIG. 2, once the carrier has been attached to the spare tire a bike is mounted onto the support 16. (In the preferred embodiment the carrier is adapted to hold two bikes, side by side.) This support 16 comprises one or more saddles or troughs 31 of sufficient size and dimension to accept the frame tube of a bicycle. These troughs are positioned to span a pair of support arms 32 projecting rearwardly from the upper hooks 12. (Alternatively, these support arms may be attached to and project rewardly from the base section 17.)

Attachment of the bike to the support is accomplished with a locking mechanism as illustrated sequentially in FIGS. 6a–6d. With a bicycle frame tube 40 positioned on the saddle 31, a hook member 42 is brought up and over the bicycle frame tube (FIG. 6b) and then into engagement therewith (FIG. 6c). The lower extremity of this hook is attached to a locking lever 48 through a pivotally attached threaded adjustment nut 46. This locking lever 48 is pivotally attached to a depending channel member 44 of the saddle member 31. By use of the adjustment nut 46 the reach of the hook can be selected to allow the locking lever to achieve a locked position (FIG. 6d). With this locking lever in the locked position, holes 50a in the locking lever now line up with holes 50b in the depending channel member 44 to allow the addition of a padlock. When in the locked position, as shown in FIGS. 2 and 6d, the adjustment nut 46 is enveloped within the depending channel member for security, in the same manner as the mechanism for locking the carrier onto the tire.

Figure 4:
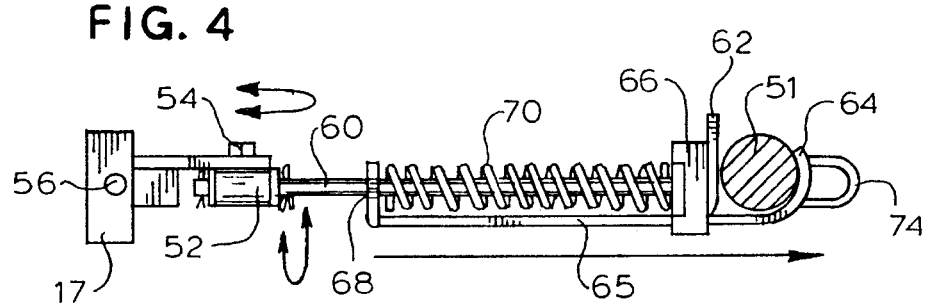
FIG. 4 is a top view of the stabilizing device of this carrier.

Once the bicycle frame has been mounted into the support saddle 31, as described above, the stabilizers 15 (shown in detail in FIG. 4) are attached to the bicycle frame 51. These stabilizers are mounted to the carrier base section 17 through pivoting joints 52, 54 and 56 (or equivalent universal joint). Extending from this jointed attachment is a first stabilizer arm 60 which terminates in a first jaw 62. A second jaw 64 is integral with a second sliding arm 65 which extends parallel to the first arm and through a block 66 carried on the first arm. This second arm slidingly engages the first stabilizer arm at attachment 68 such that a spring 70 between that attachment and the block biases the jaws closed against the bicycle frame 51. A loop handle 74 allows one to pull the second jaw open for easy attachment to the bicycle frame.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A bicycle carrier comprising:

a base member exhibiting a channel thereon;

first clamping hook means and second clamping hook means mounted to said base member for clamping onto an object positioned therebetween, wherein said second clamping hook means comprises a slide member slidably engaged with said base member within said channel of said base member, and a hook member attached to said slide member;

locking means selectively disposed and operable within said channel of said base member comprising a lockable lever pivotally connected to said slide member and to said base member for selectively extending and locking said slide member, said locking means being positioned within said channel such that said locking means is inaccessible when locked; and bicycle supporting means projecting from said first clamping hook means for supporting a bicycle.

2. The bicycle carrier of claim 1 further comprising stabilizing means projecting from said base member and spaced from said bicycle supporting means for limiting motion of a bicycle mounted on said supporting means.

3. The bicycle carrier of claim 2 wherein said bicycle supporting means projecting from said first clamping hook means comprises dual support arms rigidly attached to said first clamping hook means and projecting therefrom, trough members transversely positioned on said dual support arms for accepting the frame tube of a bicycle, and bicycle locking means mounted to said trough members for securing the bicycle frame in said trough members.

4. The bicycle carrier of claim 3 wherein said stabilizing means comprises a stabilizing arm pivotally connected to said base member at one end and terminating in a first jaw at its other end, a sliding arm slideably engaging said stabilizer arm at one end and terminating in a second jaw at its other end, and a spring intermediate said first jaw and said sliding engagement of said arms for urging said jaws against one another.

5. The bicycle carrier of claim 4 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

6. The bicycle carrier of claim 2 wherein said stabilizing means comprises a stabilizing arm pivotally connected to said base member at one end and terminating in a first jaw at its other end, a sliding arm slideably engaging said stabilizer arm at one end and terminating in a second jaw at its other end, and a spring intermediate said first jaw and said sliding engagement of said arms for urging said jaws against one another.

7. The bicycle carrier of claim 2 wherein said locking means further comprises a threaded bolt member engaged with threaded nut means integral with said lever member and engaged with threaded nut means integral with said slide member.

8. The bicycle carrier of claim 7 wherein said bicycle supporting means projecting from said first clamping hook means comprises dual support arms rigidly attached to said first clamping hook means and projecting therefrom, trough members transversely positioned on said dual support arms for accepting the frame tube of a bicycle, and bicycle locking means mounted to said trough members for securing the bicycle frame in said trough members.

9. The bicycle carrier of claim 8 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

10. The bicycle carrier of claim 1 wherein said bicycle supporting means projecting from said first clamping hook means comprises dual support arms rigidly attached to said first clamping hook means and projecting therefrom, trough members transversely positioned on said dual support arms for accepting the frame tube of a bicycle, and bicycle locking means mounted to said trough members for securing the bicycle frame in said trough members.

11. The bicycle carrier of claim 10 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

12. The bicycle carrier of claim 1 wherein said locking means further comprises a threaded bolt member engaged with threaded nut means integral with said lever member and engaged with threaded nut means integral with said slide member.

13. The bicycle carrier of claim 12 wherein said bicycle supporting means projecting from said first clamping hook means comprises dual support arms rigidly attached to said first clamping hook means and projecting therefrom, trough members transversely positioned on said dual support arms for accepting the frame tube of a bicycle, and bicycle locking means mounted to said trough members for securing the bicycle frame in said trough members.

14. The bicycle carrier of claim 13 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

* * * * *